(12) United States Patent
Tanaka

(10) Patent No.: US 6,941,744 B2
(45) Date of Patent: Sep. 13, 2005

(54) EXHAUST EMISSION CONTROL SYSTEM AND METHOD

(75) Inventor: Hiroshi Tanaka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 95 days.

(21) Appl. No.: 10/682,730

(22) Filed: Oct. 10, 2003

(65) Prior Publication Data

US 2004/0074226 A1 Apr. 22, 2004

(30) Foreign Application Priority Data

Oct. 21, 2002 (JP) ........................................ 2002-305879

(51) Int. Cl.$^7$ ................................................. F01N 3/00
(52) U.S. Cl. ............................ 60/277; 60/274; 60/285; 60/286; 60/297
(58) Field of Search .......................... 60/274, 276, 277, 60/285, 286, 295, 297, 301

(56) References Cited

U.S. PATENT DOCUMENTS

| | | | |
|---|---|---|---|
| 5,735,119 A | | 4/1998 | Asanuma et al. |
| 6,167,695 B1 | | 1/2001 | Itou et al. |
| 6,195,987 B1 | * | 3/2001 | Miyashita .................... 60/285 |
| 6,357,224 B1 | | 3/2002 | Kawamoto et al. |
| 6,460,329 B2 | * | 10/2002 | Shimotani et al. ............ 60/285 |
| 6,484,493 B2 | * | 11/2002 | Takanohashi ................. 60/277 |
| 6,487,851 B1 | * | 12/2002 | Okada et al. .................. 60/285 |
| 6,568,179 B2 | * | 5/2003 | Deeba .......................... 60/298 |

FOREIGN PATENT DOCUMENTS

| | | |
|---|---|---|
| JP | A 7-208151 | 8/1995 |
| JP | A 2000-130212 | 5/2000 |

* cited by examiner

Primary Examiner—Binh Q. Tran
(74) Attorney, Agent, or Firm—Oliff & Berridge, PLC

(57) ABSTRACT

An exhaust emission control system for an internal combustion engine is provided which includes a NOx storage/reduction catalyst disposed in an exhaust passage of the engine, and a NOx sensor positioned in the exhaust passage downstream of the catalyst. A controller of the system performs a rich-spike operation to temporarily operate the engine at a rich air/fuel ratio each time a NOx storage state of the catalyst satisfies a predetermined rich-spike condition during a lean-burn operation. When the degree of degradation of the catalyst is determined by comparing the output of the NOx sensor with a predetermined evaluation value, the rich-spike condition is changed so that the amount of NOx stored in the catalyst at the time of a start of the rich-spike operation during a degradation determination period is made larger than that reached during a period other than the determination period.

8 Claims, 6 Drawing Sheets

EXHAUST EMISSION CONTROL SYSTEM AND METHOD

INCORPORATION BY REFERENCE

The disclosure of Japanese Patent Application No. 2002-305879 filed on Oct. 21, 2002, including the specification, drawings and abstract, is incorporated herein by reference in its entirety.

BACKGROUND OF THE INVENTION

1. Field of the Invention

The invention relates generally to exhaust emission control system and method for an internal combustion engine, and, more particularly, to such exhaust emission control system and method that purify exhaust emissions by using a NOx storage/reduction catalyst, and have a function or step of determining the degree of degradation of the NOx storage/reduction catalyst. The NOx storage/reduction catalyst is adapted to selectively store NOx contained in exhaust gas, through adsorption, absorption or both of them, when the air/fuel ratio of the exhaust gas flowing into the catalyst is lean, and reduce and remove the stored NOx by using reducing components in the exhaust gas when the air/fuel ratio of the exhaust gas flowing into the catalyst becomes equal to the stoichiometric air/fuel ratio or a rich air/fuel ratio.

2. Description of Related Art

An exhaust emission control system is known which purifies exhaust gas of NOx contained therein, by using a NOx storage/reduction catalyst that selectively stores NOx in the exhaust gas, through adsorption, absorption or both of them, when the air/fuel ratio of the exhaust gas flowing into the catalyst is lean, and reduces and removes the stored NOx by using reducing components contained in the exhaust gas when the air/fuel ratio of the exhaust gas flowing into the catalyst becomes stoichiometric or rich.

However, the NOx storage/reduction catalyst undergoes degradation or deterioration for various reasons, and its capability of removing NOx from exhaust gas is reduced due to the degradation. For example, in the case where a sulfur component is contained in a fuel of the internal combustion engine, the NOx storage/reduction catalyst stores sulfur oxides in the exhaust gas, which are generated by combustion of the sulfur component in the fuel, in substantially the same manner in which the catalyst stores NOx. If the amount of the sulfur oxides (SOx) stored in the NOx storage/reduction catalyst is increased, the NOx storage capacity of the NOx storage/reduction catalyst is reduced by a degree corresponding to the stored SOx amount, and the amount of NOx that passes through the NOx storage/reduction catalyst without being trapped or stored by the catalyst during a lean-burn operation of the engine is increased.

The NOx stored in the NOx storage/reduction catalyst can be discharged from the catalyst for reduction and removal, through a rich-spike operation in which the engine is temporarily operated at a rich air/fuel ratio so that exhaust gas having a rich air/fuel ratio is supplied to the catalyst.

However, the above-mentioned SOx stored in the NOx storage/reduction catalyst is not discharged from the catalyst through the rich-spike operation for reduction and removal of NOx, and therefore the amount of SOx stored in the NOx storage/reduction catalyst gradually increases as the engine keeps operating at a lean air/fuel ratio, resulting in so-called sulfur poisoning or S poisoning, which causes a gradual reduction in the NOx removal capability of the NOx storage/reduction catalyst.

In addition to the S poisoning, the NOx storage/reduction catalyst may degrade due to, for example, a long period of use or operations under a high-temperature environment, resulting in a reduction in the NOx storage capacity.

The S poisoning may be eliminated by, for example, performing a poisoning eliminating operation in which a fuel-rich exhaust gas having a higher temperature than that used in normal rich-spike operations is supplied to the NOx storage/reduction catalyst so as to discharge the stored SOx from the NOx storage/reduction catalyst.

The NOx storage/reduction catalyst that has degraded for reasons other than S poisoning may not be recovered or restored to its original state, and the catalyst may need to be replaced by a new one in the case where such degradation occurs.

In order to appropriately eliminate the S-poisoning or replace the catalyst by a new one as described above, it is necessary to accurately determine that the NOx storage/reduction catalyst has degraded to such an extent that necessitates or requires the poisoning eliminating operation or replacement.

In a known technology for determining the degree of degradation of the NOx storage/reduction catalyst, a NOx sensor for detecting the NOx concentration in exhaust gas is disposed in an exhaust passage located downstream of the NOx storage/reduction catalyst, and the degree of degradation of the NOx storage/reduction catalyst is determined based on an output signal of the NOx sensor. Examples of exhaust emission control systems that determine the degradation of the catalyst in this manner are disclosed in, for example, Japanese Laid-open Patent Publications No. 7-208151 (JP-A-7-208151) and No. 2000-130212 (JP-A-2000-130212), and U.S. Pat. No. 6,167,695.

The system as disclosed in JP-A-7-208151 determines that the NOx storage/reduction catalyst has degraded when the time required for the exhaust NOx concentration detected by a NOx sensor located downstream of the NOx storage/reduction catalyst to increase to a predetermined level after a rich-spike operation is equal to or shorter than a predetermined time.

As the NOx storage amount increases, the NOx storage capacity of the NOx storage/reduction catalyst is reduced, and the amount of NOx that passes through the NOx storage/reduction catalyst without being trapped by the catalyst, out of NOx contained in the exhaust gas flowing into the catalyst, is increased. The NOx storage capacity thus reduced due to the increase in the NOx storage amount is normally restored through a rich-spike operation for reducing and removing the stored NOx. However, the SOx stored in the NOx storage/reduction catalyst is not discharged from the catalyst through a normal rich-spike operation, and therefore SOx remains in the catalyst even after rich spikes if the catalyst suffers from S poisoning, resulting in a reduction in the NOx storage capacity by a degree corresponding to the amount of SOx stored in the catalyst.

In the case where degradation of the catalyst occurs for other reasons than S poisoning, too, the NOx storage capacity is not completely restored even after rich spikes are executed. Namely, once the NOx storage/reduction catalyst undergoes degradation, the NOx storage capacity of the catalyst is not completely restored even after rich spikes. Upon occurrence of S poisoning, therefore, the NOx storage capacity of the catalyst is largely reduced due to absorption of even a relatively small amount of NOx after a rich-spike operation, and the amount of NOx that passes through the catalyst without being stored or trapped is increased within a short time.

The system disclosed in JP-A-7-208151 is adapted to measure the exhaust NOx concentration by means of the NOx sensor located downstream of the catalyst after a rich spike is executed, and determines that the NOx storage capacity is not sufficiently restored even after the rich spike, namely, the NOx storage/reduction catalyst undergoes degradation, when the time required for the NOx concentration to increase to the predetermined level is shorter than the predetermined time.

JP-A-2000-130212 discloses a technology for determining degradation of the NOx storage/reduction catalyst, by determining the amount of NOx emitted by the engine (which will be called "NOx emission amount") based on the engine operating conditions, and comparing a value obtained by multiplying the NOx emission amount by the NOx absorption efficiency of the NOx storage/reduction catalyst that is determined depending upon the engine operating conditions, with the actual NOx concentration detected by a NOx sensor located downstream of the catalyst.

Namely, in the emission control system of JP-A-2000-130212, the amount of NOx (reference concentration) that would pass through the NOx storage/reduction catalyst and reach the downstream side thereof without being absorbed by the catalyst if the NOx storage/reduction catalyst is in a normal (i.e., non-degraded) state, out of the NOx generated by the engine, is determined as a product of the NOx emission amount of the engine and the NOx absorption efficiency of the catalyst. Then, it is determined that the catalyst undergoes degradation if the amount (concentration) of NOx that has actually passed through the catalyst to the downstream side thereof is larger than the reference concentration thus determined.

In the systems disclosed in JP-A-7-208151, JP-A-2000-130212 and U.S. Pat. No. 6,167,695, the degradation of the catalyst is determined based on the exhaust NOx concentration detected by the NOx sensor. However, these systems fail to take account of the reliability of the output of the NOx sensor (or the detection accuracy of the sensor), thus giving rise to a possibility that false or inaccurate determinations are made on the degradation of the catalyst.

In general, the NOx detection accuracy of the NOx sensor, namely, the reliability of the output of the NOx sensor, is considerably reduced or deteriorated in a low NOx concentration region. Nevertheless, when the degradation of the NOx storage/reduction catalyst is determined by the methods of JP-A-7-208151 and JP-A-2000-130212, a NOx-concentration judgment value based on which the degradation is detected needs to be set to a value in a relatively low concentration region.

Supposing that the upper limit concentration of the NOx emission level needs to be kept equal to or lower than, for example, 40 ppm, the purpose of determining degradation of the catalyst cannot be adequately accomplished if the occurrence of degradation is determined after the catalytic degradation has progressed to a point where the exhaust NOx concentration measured downstream of the catalyst has reached the upper limit concentration of 40 ppm. It is thus necessary to determine the progression of the degradation at an earlier point of time, and take measures, such as elimination of S poisoning, against the degradation.

For example, in the case where the degradation of the NOx storage/reduction catalyst is determined when rich-spike operations are periodically performed, if the exhaust NOx concentration measured downstream of the catalyst has reached 40 ppm at the time of a rich-spike operation, the emitted NOx concentration will far exceed the upper limit concentration under operating conditions (e.g., during acceleration of the vehicle) in which the NOx emission amount is far larger than that measured at the time of the rich-spike operation.

In order to constantly keep the exhaust NOx concentration equal to or lower than the upper limit value, therefore, it is necessary to determine that the degradation of the NOx storage/reduction catalyst has progressed (or the catalyst undergoes degradation) when the exhaust NOx concentration measured downstream of the catalyst immediately before a rich spike (i.e., upon a start of a rich spike) reaches a far lower value (e.g., about 10 ppm), and take measures, such as an operation to eliminate S poisoning, against the degradation of the catalyst.

Accordingly, in order to determine the degradation of the NOx storage/reduction catalyst at an earlier time in the methods of JP-A-7-208151 and JP-A-2000-130212, the degradation evaluation concentration as a criterion for determining degradation needs to be set to a sufficiently low level. However, the detection accuracy of the NOx sensor is considerably reduced in a low concentration region, as described above, and therefore the reliability of the degradation determination itself is reduced if the degradation evaluation concentration is lowered.

Thus, the conventional emission control systems are not able to accurately determine degradation of the NOx storage/reduction catalyst, and may cause a problem that the exhaust NOx concentration exceeds the upper limit value under operating conditions in which the NOx emission amount of the engine is increased.

SUMMARY OF THE INVENTION

It is therefore an object of the invention to provide an exhaust emission control system for an internal combustion engine, which is able to easily and accurately determine degradation of a NOx storage/reduction catalyst when the determination is made by using a NOx sensor positioned downstream of the NOx storage/reduction catalyst. It is another object of the invention to provide such an exhaust emission control method.

To accomplish the above and/or other object(s), there is provided according to one aspect of the invention an exhaust emission control system for an internal combustion engine, which comprises: (a) a NOx storage/reduction catalyst disposed in an exhaust passage of the internal combustion engine, the NOx storage/reduction catalyst selectively storing NOx contained in exhaust gas flowing into the catalyst, through adsorption, absorption, or both of adsorption and absorption, when an air/fuel ratio of the exhaust gas is lean, and reducing and removing the stored NOx by using reducing components in the exhaust gas when the air/fuel ratio of the exhaust gas becomes equal to a stoichiometric air/fuel ratio or a rich air/fuel ratio, (b) a NOx sensor positioned in the exhaust passage downstream of the NOx storage/reduction catalyst, the NOx sensor being operable to detect a NOx concentration in the exhaust gas, and (c) a controller. The controller of the system performs a rich-spike operation to temporarily operate the engine at a rich air/fuel ratio each time a NOx storage state of the NOx storage/reduction catalyst satisfies a predetermined rich-spike condition during an operation of the engine at a lean air/fuel ratio, so as to supply exhaust gas having a rich air/fuel ratio to the NOx storage/reduction catalyst for reduction and removal of the NOx stored in the NOx storage/reduction catalyst. The controller also determines a degree of degradation of the NOx storage/reduction catalyst by comparing an output value of the NOx sensor obtained in a predetermined determination period during the operation of the engine at a lean air/fuel ratio, with a predetermined evaluation value, and changes the rich-spike condition so that an amount of NOx stored in the NOx storage/reduction catalyst at the time of a start of the rich-spike operation during the determination period is made larger than the amount of NOx stored in the catalyst at the time of the start of the rich-spike operation during a period other than the determination period.

In the exhaust emission control system as described above, the rich-spike operation is performed each time the NOx storage state of the NOx storage/reduction catalyst satisfies the predetermined rich-spike condition, so that the exhaust gas having the rich air/fuel ratio is supplied to the NOx storage/reduction catalyst. The NOx storage state represents an amount indicative of a state that is associated with or related to the amount of NOx stored in the NOx storage/reduction catalyst. For example, the NOx storage state means a value, such as a value of an NOx counter that represents the NOx storage amount as described later, or an elapsed time, running distance or an integrated value of the engine speed measured from execution of the last rich-spike operation, which represents the amount of NOx stored in the NOx storage/reduction catalyst.

In the exhaust emission control system according to the above aspect of the invention, the rich-spike operation is performed each time the NOx storage state meets the predetermined rich-spike condition (for example, each time the NOx storage amount reaches a predetermined value, or each time the elapsed time, running distance, or the integrated value of the engine speed, measured from the time of completion of the last rich-spike operation reaches a predetermined value) during a normal lean-burn operation, namely, during a period other than the degradation determination period. With this arrangement, the NOx storage amount of the NOx storage/reduction catalyst is prevented from increasing to be larger than a given value, and therefore the exhaust NOx concentration (or emitted NOx concentration) measured downstream of the catalyst is constantly kept at a relatively low value.

When degradation of the NOx storage/reduction catalyst is determined, on the other hand, the rich-spike starting condition is changed so that the rich-spike operation is not started until the amount of NOx stored in the NOx storage/reduction catalyst reaches a value that is larger than the amount (the normal reference value) at which the rich-spike operation is started during the normal lean-burn operation. For example, the start of the rich-spike operation is delayed, namely, the rich-spike operation is started at a later point of time than the normal starting point, so as to increase the NOx storage amount of the NOx storage/reduction catalyst at the time of the start of the rich-spike operation to be larger than the amount used in the normal lean-burn operation.

With the above arrangement, during the degradation determination period, the NOx storage/reduction catalyst stores a relatively large amount of NOx that is not reached during the normal lean-burn operation, and the emitted NOx concentration measured downstream of the catalyst also increases to a higher level than that reached during the normal lean-burn operation.

For example, where a rich-spike starting condition is set so that a rich-spike operation is carried out each time A mg of NOx is stored in the NOx storage/reduction catalyst during a normal lean-burn operation, it may be determined that the catalyst has degraded when the NOx concentration of the exhaust gas emitted from the catalyst reaches 10 ppm immediately before a rich spike (namely, in a condition where the storage amount is equal to A mg).

In the above case, the NOx sensor disposed downstream of the catalyst is required to permit accurate detection of the NOx concentration even in a low concentration region around 10 ppm. However, since the detection accuracy of the actual NOx sensor is considerably reduced in such a low concentration region, the NOx concentration cannot be detected with high accuracy in this region, and the degradation of the NOx storage/reduction catalyst cannot be determined with high accuracy.

According to the above aspect of the invention, only in the case where degradation of the NOx storage/reduction catalyst is determined, a rich-spike operation is temporarily delayed until the NOx storage amount of the NOx storage/reduction catalyst reaches a certain amount (e.g., an amount that is 1.5 times as large as A mg) that is larger than A mg.

In this case, 1.5 A mg of NOx is stored in the NOx storage/reduction catalyst immediately before the rich-spike operation is started. As the amount of NOx stored in the NOx storage/reduction catalyst increases, the amount of NOx emitted from the catalyst increases in accordance with the increase in the NOx storage amount, though the NOx emission amount is depending upon the type and other parameters of the catalyst. In the case of a NOx storage/reduction catalyst that is in a degraded condition, for example, if the amount of NOx emitted from the catalyst that stores A mg of NOx is equal to 10 ppm, the emitted NOx concentration will be about 20 ppm when the NOx storage amount becomes equal to 1.5 A mg.

Since the NOx sensor exhibits sufficiently high detection accuracy in a NOx concentration region around 20 ppm, it becomes possible to determine the degree of degradation of the NOx storage/reduction catalyst with considerably high accuracy in this concentration region, by using the output of the NOx sensor disposed downstream of the NOx storage/reduction catalyst.

Thus, according to the above aspect of the invention, the emitted NOx concentration to be achieved for degradation determination is increased by causing the NOx storage/reduction catalyst to store a large amount of NOx that would not be reached during a normal lean-burn operation, so that the degree of degradation of the NOx storage/reduction catalyst can be easily and accurately determined.

In one preferred embodiment of the invention, the controller uses the amount of NOx stored in the NOx storage/reduction catalyst as the NOx storage state of the NOx storage/reduction catalyst, and uses a condition that the amount of NOx stored in the catalyst reaches a predetermined reference storage amount as the predetermined rich-spike operation. In this embodiment, the controller also sets the reference storage amount during the determination period to a larger value than the reference storage amount set during the period other than the determination period, so as to increase the amount of NOx stored in the NOx storage/reduction catalyst at the time of the start of the rich-spike operation during the determination period, to be larger than the amount of NOx stored in the NOx storage/reduction catalyst at the time of the start of the rich-spike operation during the period other than the determination period.

In the embodiment as described above, where a rich-spike operation is performed during normal engine operations each time the amount of NOx stored in the NOx storage/ reduction catalyst reaches a predetermined reference amount, the reference amount is increased during the period in which degradation of the catalyst is determined. With this arrangement, the amount of NOx stored in the NOx storage/reduction catalyst until the rich-spike operation is performed is increased during degradation determination, to a larger value than that employed during normal operations, and the degradation of the catalyst is determined based on the output of NOx sensor while the NOx storage amount is larger than the reference amount employed during normal lean-burn operations. Consequently, the reliability of the output of the NOx sensor is improved, and the degree of degradation of the NOx storage/reduction catalyst can be easily and accurately determined.

In another preferred embodiment of the invention, the controller uses an elapsed time measured from the time of completion of the last rich-spike operation as the NOx storage state of the NOx storage/reduction catalyst, and uses a condition that the elapsed time reaches a predetermined reference time as the predetermined rich-spike condition. In this embodiment, the controller also sets the reference time during the determination period to be longer than the reference time set during the period other than the determination period, so as to increase the amount of NOx stored in the NOx storage/reduction catalyst at the time of the start of the rich-spike operation during the determination period, to be larger than the amount of NOx stored in the NOx storage/reduction catalyst at the time of the start of the rich-spike operation during the period other than the determination period.

In the embodiment as described above, while rich-spike operations are performed on the NOx storage/reduction catalyst at predetermined time intervals during normal lean-burn operations, the interval of execution of the rich-spike operations is set during degradation determination, to be longer than that set for the normal lean-burn operations, so that the degradation of the catalyst can be determined in a condition in which the NOx storage amount of the NOx storage/reduction catalyst is increased to be larger than the amount that would be reached during the normal lean-burn operations. In this manner, the emitted NOx concentration used as a criterion for degradation determination is increased, so that the degree of degradation of the NOx storage/reduction catalyst can be easily and accurately determined based on the output of the NOx sensor.

BRIEF DESCRIPTION OF THE DRAWINGS

The foregoing and/or further objects, features and advantages of the invention will become more apparent from the following description of exemplary embodiments with reference to the accompanying drawings, in which like numerals are used to represent like elements and wherein.

DETAILED DESCRIPTION OF EXEMPLARY EMBODIMENTS

An exemplary embodiment of the invention will be described with reference to the accompanying drawings.

Figure 1:
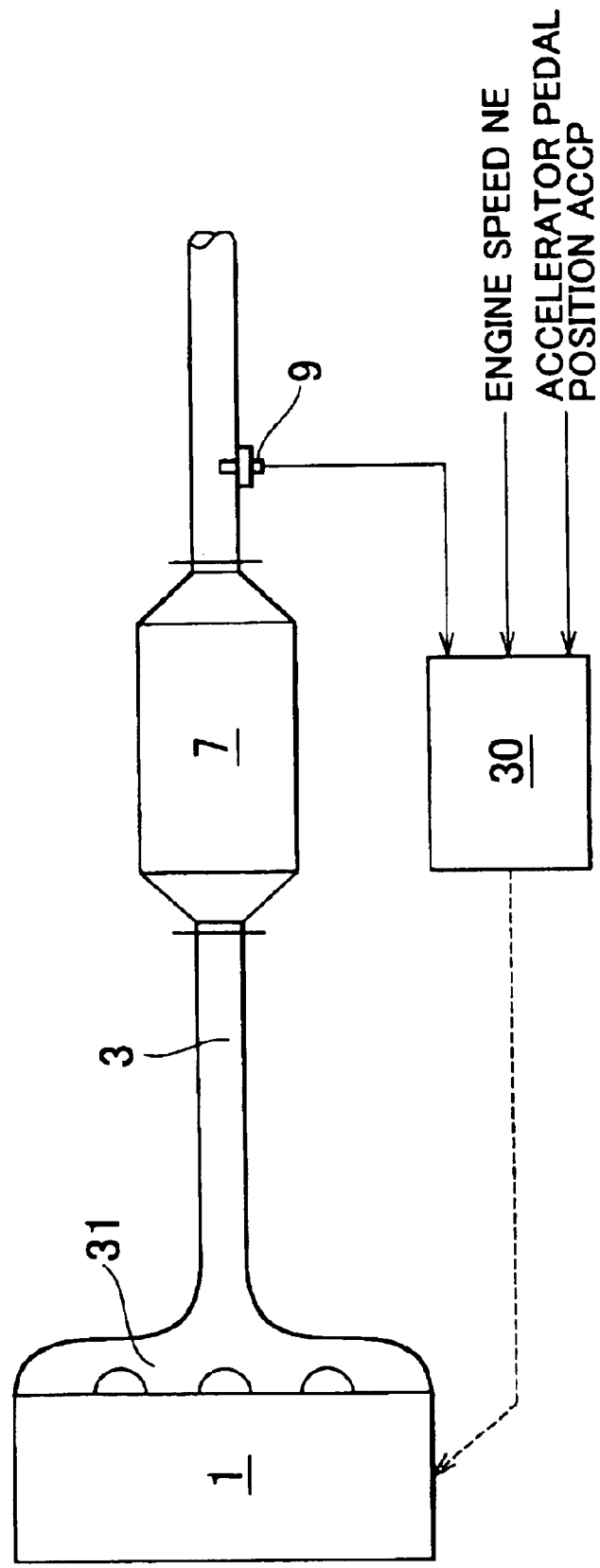
FIG. 1 is a view schematically showing the construction of an exhaust emission control system according to one embodiment of the invention when it is applied to an internal combustion engine of an automobile.

FIG. 1 schematically shows the construction of an exhaust emission control system as one exemplary embodiment of the invention when applied to an internal combustion engine of a vehicle, such as an automobile.

The system shown in FIG. 1 includes a main body of the internal combustion engine 1, an exhaust pipe 3 through which exhaust gas emitted by the engine 1 flows, and an exhaust manifold 31 that connects the exhaust pipe 3 to exhaust ports of respective cylinders of the engine 1.

In the present embodiment, a NOx storage/reduction catalyst 7 is disposed in the exhaust passage 3. The NOx storage/reduction catalyst 7 selectively traps and stores NOx contained in exhaust gas flowing into the catalyst, through adsorption or absorption or both processes, when the air/fuel ratio of the incoming exhaust gas is lean, and reduces and removes the stored NOx by using components, such as HC and CO, in the exhaust gas when the air/fuel ratio of the incoming exhaust gas becomes equal to the stoichiometric air/fuel ratio or becomes rich.

The engine 1 of the present embodiment is a so-called lean-burn engine, which is capable of operating at a lean air/fuel ratio depending upon its operating conditions. When the engine 1 is operated at a lean air/fuel ratio, NOx components in the exhaust gas of the engine 1 are stored by the NOx storage/reduction catalyst 7, and are thus prevented from being discharged to the outside of the vehicle.

In the present embodiment, a NOx sensor 9 as described later is disposed in an exhaust passage located downstream of the NOx storage/reduction catalyst 7. The NOx sensor 9 is operable to generate a voltage signal that varies with the concentration of the NOx components in the exhaust gas.

In FIG. 1, reference numeral 30 denotes an electronic control unit (ECU) that performs basic controls, such as fuel injection control and ignition timing control, of the engine 1. The ECU 30 includes a microcomputer of a known type, in which a random access memory (RAM), a read-only memory (ROM) and a central processing unit (CPU) are connected to one another via a bi-directional bus. In the present embodiment, the ECU 30 performs rich-spike operations, in addition to the above-described basic controls. More specifically, the ECU 30 estimates the amount of NOx stored in the NOx storage/reduction catalyst during an operation of the engine 1 at a lean air/fuel ratio, and operates the engine 1 at a rich air/fuel ratio for a short period of time each time the stored NOx amount reaches a predetermined reference amount, thereby to reduce and remove the NOx stored in the NOx storage/reduction catalyst.

In addition to the above-mentioned operations, the ECU 30 of the present embodiment also performs a degradation determining operation as described later, in which the ECU 30 detects a reduction in the NOx storage capacity of the NOx storage/reduction catalyst, and determines the degree of degradation of the catalyst.

To perform the above-mentioned controls, the ECU 30 receives, at an input port thereof, various parameters indicative of operating conditions of the engine 1, such as the intake mass flow, the amount of depression of the accelerator pedal by the driver (or accelerator pedal position), the engine speed and the coolant temperature, from respective sensors (not shown). The ECU 30 also receives an output signal of the NOx sensor 9 via an A/D converter (not shown). Also, the ECU 30 is connected at an output port thereof to fuel injectors and ignition plugs (not shown), so as to control the fuel injection amount and ignition timing of the engine in accordance with the operating conditions.

Next, the NOx sensor 9 used in this embodiment will be described in detail.

Figure 2:
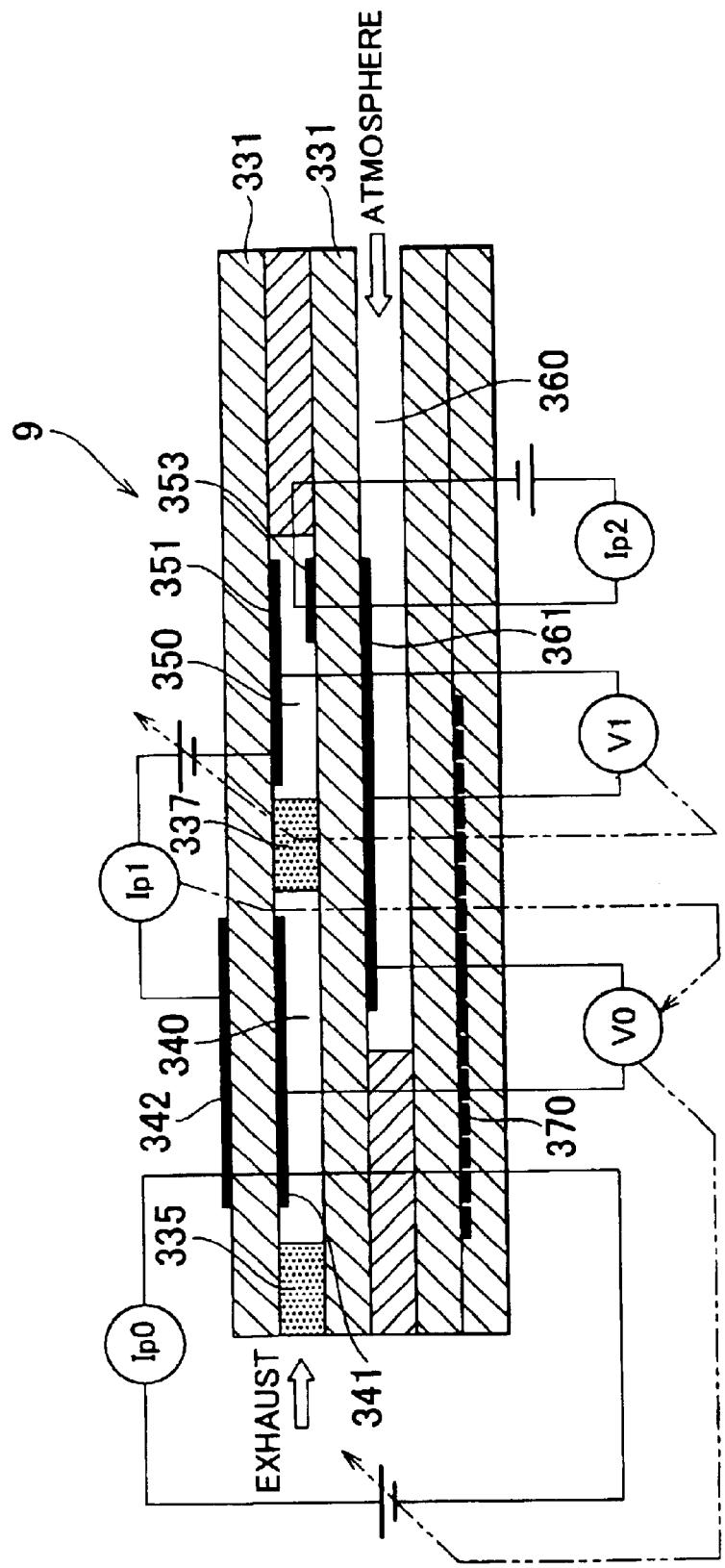
FIG. 2 is a view useful for explaining the principle of NOx detection of a NOx sensor.

FIG. 2 is a cross-sectional view schematically showing the general structure of the NOx sensor 9. Referring to FIG. 2, the NOx sensor 9 is mainly formed of solid electrolyte 331, such as zirconia ($ZrO_2$), and a first reaction chamber 340, a second reaction chamber 350 and an atmosphere chamber 360 are provided in the solid electrolyte 331. The first reaction chamber 340 communicates with the exhaust passage via a diffusion control portion 335, and the second reaction chamber 350 communicates with the first reaction chamber 340 via a diffusion control portion 337, while the atmosphere as a standard gas is introduced into the atmosphere chamber 360. The diffusion control portions 335, 337 control or restrict flow of an oxygen component through diffusion into the first reaction chamber 340 and the second reaction chamber 350, respectively, so that differences in the oxygen concentration between the exhaust gas in the exhaust passage and a gas present in the first reaction chamber and between the gas in the first reaction chamber and a gas present in the second reaction chamber 2 can be maintained.

As shown in FIG. 2, a platinum electrode (cathode) 341 is disposed in the first reaction chamber 340, and a similar platinum electrode (anode) 342 is disposed outside the sensor 9 such that the electrode 341 and the electrode 342 are opposed to each other via the solid electrolyte 331 interposed therebetween. Also, a similar platinum electrode 351 and a rhodium (Rh) electrode 353 used for detection of NOx are disposed in the second reaction chamber 350, and a platinum electrode 361 as a reference electrode is disposed in the atmosphere chamber 360. In FIG. 2, reference numeral 370 denotes an electric heater used for heating the solid electrolyte.

The electrode 341 in the first reaction chamber 340 and the outside electrode 342 function as an oxygen pump for discharging oxygen in the exhaust gas present in the first reaction chamber 340 to the outside of the NOx sensor 9, and the electrode 351 in the second reaction chamber 350 and the outside electrode 342 function as an oxygen pump for discharging oxygen in the exhaust gas present in the second reaction chamber 350 to the outside. If a voltage is applied between the electrodes 341 and 342 and between the electrodes 351 and 342 while the solid electrolyte 331 is kept at a given temperature or higher, oxygen molecules in the exhaust gas are ionized on the cathodes 341, 351, and the ionized oxygen molecules (i.e., oxygen ions) move toward the anode 342 through the solid electrolyte 331, and are converted into oxygen molecules on the anode 342. Through this process, oxygen contained in the exhaust gas present in the first reaction chamber 340 and the second reaction chamber 350 is discharged to the outside of the sensor 9. With the movements of the oxygen ions, electric current that is proportional to the amount of the oxygen molecules that move through the solid electrolyte 331 per unit time flows between the electrodes 342 and 341 and between the electrodes 342 and 351. By controlling this current, therefore, the amount of oxygen discharged from each reaction chamber can be controlled.

In the present embodiment, an oxygen cell is formed between the electrode 361 of the atmosphere chamber 360 and each of the electrodes 341, 351 of the respective reaction chambers 340, 350. Since the oxygen concentration of the exhaust gas in the first and second reaction chambers 340, 350 is lower than that of the atmosphere, a difference in the oxygen concentration exists between the atmosphere in the atmosphere chamber 360 and the exhaust gas in each reaction chamber. Under conditions that the temperature of the solid electrolyte that separates the atmosphere chamber 360 from each reaction chamber 340, 350 is equal to or higher than a given temperature, and no external voltage is applied between the electrodes 361 and 341 and between the electrodes 361 and 351, oxygen moves from the atmosphere chamber 360 into the reaction chambers 340, 350 through the solid electrolyte 331, due to the difference in the oxygen concentration.

More specifically, oxygen molecules contained in the atmosphere present in the atmosphere chamber 360 are ionized on the electrode 361, and move through the solid electrolyte 331 into the reaction chambers 340, 350 where the oxygen ions are converted into oxygen molecules again on the electrodes 341, 351 of the reaction chambers 340, 350 each having a relatively low oxygen concentration. As a result, a voltage that is commensurate with the difference between the oxygen concentration of the atmosphere and the oxygen concentration in each of the reaction chambers 340, 350 is developed between the electrode 361 and each of the electrodes 341, 351. Since the oxygen concentration of the atmosphere is assumed to be constant, a potential difference V0 (FIG. 2) between the electrode 361 and the electrode 341 and a potential difference V1 (FIG. 2) between the electrode 361 and the electrode 351 represent the oxygen concentrations of the exhaust gases in the first reaction chamber 340 and the second reaction chamber 351, respectively.

In the present embodiment, the oxygen pump (the electrodes 341 and 342, the electrodes 351 and 342) is provided for discharging oxygen from each reaction chamber to the outside of the NOx sensor 9, as described above. By adjusting the pump currents Ip0, Ip1 (FIG. 2) between the respective sets of the electrodes, the oxygen discharge speeds or rates of the respective oxygen pumps are controlled so that the oxygen concentration (i.e., the voltage V0, V1) of the exhaust gas in each reaction chamber 340, 350 becomes equal to a predetermined fixed value. In the present embodiment, the pump currents Ip0, Ip1 are controlled so that the oxygen concentration in the first reaction chamber 340 becomes equal to, for example, about 1 ppm, and the oxygen concentration in the second reaction chamber 350 becomes equal to, for example, about 0.01 ppm.

In the manner as described above, a reducing atmosphere having an extremely low oxygen concentration is maintained in the second reaction chamber 350. In the meantime, NOx (NO, $NO_2$) contained in the exhaust gas is not discharged to the outside by means of the oxygen pumps, and therefore the NOx concentrations in the first and second reaction chambers are kept substantially equal to that of the exhaust gas present outside of the NOx sensor 9. In this connection, the NOx detection electrode 353, which is disposed in the second reaction chamber 350 and is formed of rhodium (Rh), functions as a reduction catalyst, and reduces NOx (NO, $NO_2$) under a reducing atmosphere. Since a voltage is applied between the reference electrode 361 of the atmosphere chamber 360 and the NOx detection electrode 353, reactions as expressed by $NO \rightarrow (\frac{1}{2}) N_2 + (\frac{1}{2}) O_2$ or $NO_2 \rightarrow (\frac{1}{2}) N_2 + O_2$ occur on the NOx detection electrode 353, thereby to produce oxygen through reduction of NOx. The oxygen thus produced is ionized on the electrode 353, and moves toward the reference electrode 361 of the atmosphere chamber 360 through the solid electrolyte 331, to form oxygen molecules on the reference electrode 361.

Since the oxygen concentration in the second reaction chamber 350 is extremely low, the entire amount of the oxygen ions that flow through the solid electrolyte 331 toward the reference electrode 361 is supposed to be generated by reduction of NOx contained in the exhaust gas. Namely, the amount of the oxygen ions that flows through the solid electrolyte per unit time is commensurate with the NOx concentration in the second reaction chamber 350 (which is equivalent to the NOx concentration of the exhaust gas in the exhaust passage). Accordingly, the NOx concentration of the exhaust gas in the exhaust passage can be determined by measuring a current value (Ip2 in FIG. 2) that arises from the movements of the oxygen ions. The NOx sensor 9 of the present embodiment converts the current value Ip2 to a voltage signal, and outputs the voltage signal commensurate with the NOx concentration in the exhaust gas.

In the present embodiment, it is determined whether the NOx storage/reduction agent 7 has degraded based on the output of the NOx sensor 9, as described later. While the NOx detection accuracy of the NOx sensor 9 varies with the NOx concentration, the detection accuracy is suddenly reduced, in particular, in a low NOx concentration region (e.g., in a region equal to or lower than about 10 ppm). In order to determine the degradation of the NOx storage/reduction catalyst 7 with high accuracy by using the NOx sensor, therefore, it is necessary to use the NOx sensor in an operating region in which the result of detection of the NOx sensor 9 has a sufficiently high reliability (e.g., in a region in which the NOx concentration is equal to or higher than about 20 ppm).

In the present embodiment, therefore, the degradation of the NOx storage/reduction catalyst 7 is determined based on the result of detection of the NOx sensor 9 that operates in the region that ensures high reliability in the detection result. The operation to determine the degradation of the NOx storage/reduction catalyst 7 will be described in detail later.

Next, the above-mentioned rich-spike operation of the present embodiment will be described.

In the present embodiment, the ECU 30 estimates the amount of NOx stored in the NOx storage/reduction catalyst 7, based on the engine operating conditions, and operates the engine 1 at a rich air/fuel ratio for a short period of time so as to supply a fuel-rich exhaust gas to the NOx storage/reduction catalyst 7 when the estimated NOx storage amount reaches a predetermined amount. As a result, the NOx stored in the NOx storage/reduction catalyst 7 is reduced and removed by HC, CO and other components in the exhaust gas, so that the NOx storage amount of the NOx storage/reduction catalyst 7 is reduced, and its storage capacity is restored.

Figure 3:
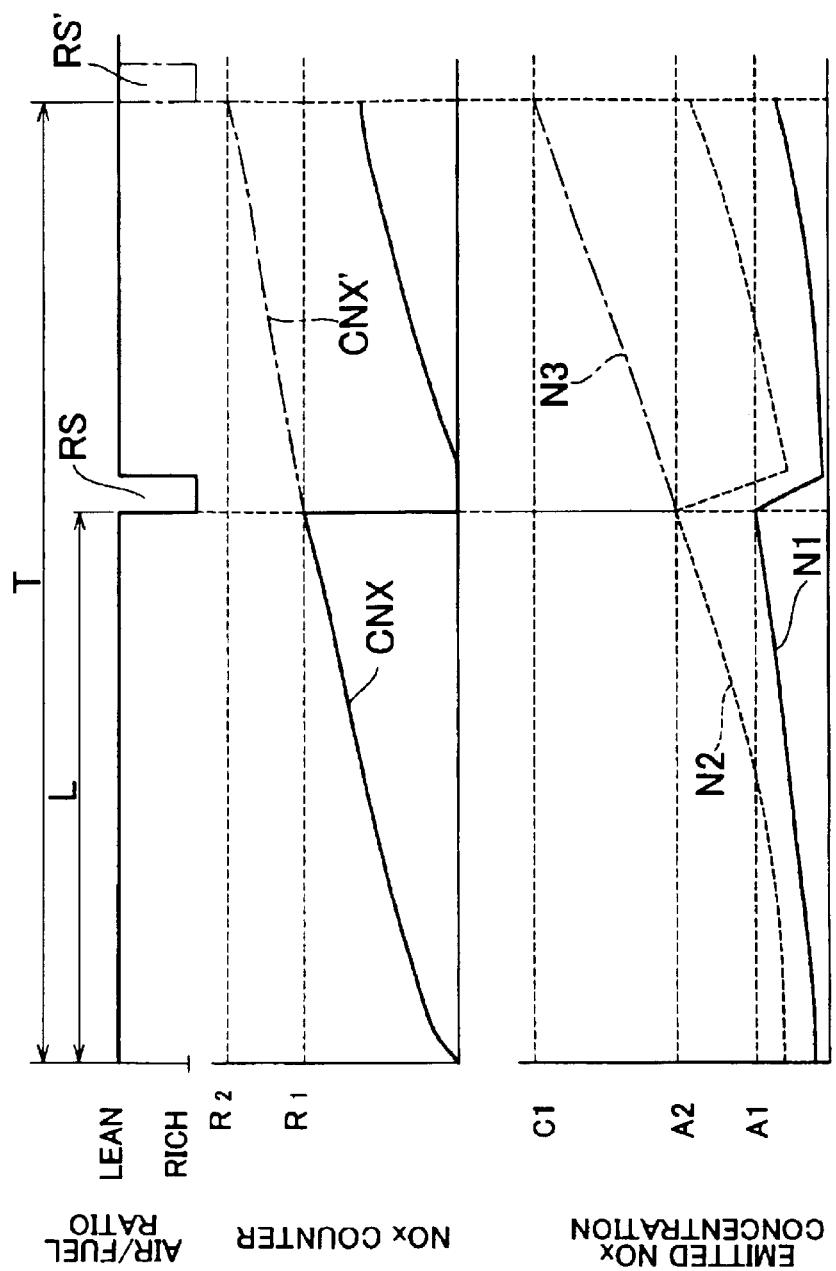
FIG. 3A through FIG. 3C are views showing variations in the NOx storage amount and the emitted NOx concentration measured downstream of a NOx storage/reduction catalyst, between rich spikes of the catalyst.

FIG. 3A through FIG. 3C show variations in the NOx storage amount of the NOx storage/reduction catalyst 7 during a lean-burn operation of the engine 1 and the exhaust NOx concentration (or emitted NOx concentration) measured downstream of the catalyst 7. Specifically, FIG. 3A shows the air/fuel ratio of the exhaust gas that flows into the NOx storage/reduction catalyst 7 (namely, the air/fuel ratio at which the engine 1 is operated), and FIG. 3B shows variations in the amount (estimated value) of NOx stored in the NOx storage/reduction catalyst 7, while FIG. 3C shows variations in the exhaust NOx concentration measured downstream of the catalyst 7.

If the engine 1 is kept operated at a lean air/fuel ratio over a certain period, e.g., period L as shown in FIG. 3A, NOx contained in the exhaust gas is trapped or stored by the NOx storage/reduction catalyst 7, and therefore the NOx storage amount of the NOx storage/reduction catalyst 7 is gradually increased. In the present embodiment, the amount of NOx emitted from the engine 1 is calculated based on the engine operating conditions, and a certain proportion of the NOx emission amount is estimated to be stored by the NOx storage/reduction catalyst 7, as described later. Then, the timing of a start of a rich-spike operation is determined by using a NOx counter that represents the NOx storage amount.

FIG. 3B indicates the value of the NOx counter CNX. As shown in FIG. 3B, the value of the NOx counter CNX increases during an operation of the engine 1 at a lean air/fuel ratio. In the present embodiment, a rich-spike operation is performed when the value of the NOx counter CNX reaches a predetermined reference value R1 (indicated in FIG. 3B).

In FIG. 3A, "RS" denotes a rich-spike operation to be performed in the present embodiment. In the rich-spike operation RS, the engine 1 is switched to an operation at a rich air/fuel ratio for a certain short period of time, so that the value of the NOx counter CNX is reset to zero upon completion of the rich-spike operation, as shown in FIG. 3B.

FIG. 3C shows variations in the exhaust NOx concentration (or emitted NOx concentration) measured downstream of the NOx storage/reduction catalyst 7 when the rich-spike operation is executed as described above.

In FIG. 3C, "N1" indicates variations in the emitted NOx concentration measured with respect to a normal NOx storage/reduction catalyst that is not degraded. While the engine 1 is operated at a lean air/fuel ratio, the NOx storage capacity of the NOx storage/reduction catalyst 7 is reduced as the NOx storage amount of the catalyst 7 increases, and therefore the amount of NOx that passes through the catalyst 7 and reaches the downstream side thereof without being trapped by the catalyst 7 is increased. Thus, the emitted NOx concentration gradually increases as indicated by the curve N1, and then decreases to an approximately zero level again when a rich spike RS is executed so as to restore the NOx storage capacity of the catalyst 7. In FIG. 3C, "A1" indicates the emitted NOx concentration obtained immediately before the rich-spike operation is started. Namely, the NOx concentration in the exhaust gas emitted from the normal NOx storage/reduction catalyst does not increase to a level higher than A1. In other words, A1 is the highest level of the NOx concentration that can be reached by the normal NOx storage/reduction catalyst.

On the other hand, in the case where the NOx storage/reduction catalyst 7 undergoes or suffers degradation due to S poisoning or for other reasons, the NOx storage capacity of the NOx storage/reduction catalyst 7 is not completely restored even if rich spikes are executed, and therefore the emitted NOx concentration is still at a relatively high level even after execution of the rich spikes. In FIG. 3C, "N2" indicates variations in the emitted NOx concentration measured with respect to a NOx storage/reduction catalyst that has been degraded. Since the degraded NOx storage/reduction catalyst starts storing NOx in a condition where the emitted NOx concentration is still at a relatively high level even after completion of a rich spike, the emitted NOx concentration is kept higher than that of the normal catalyst (N1) over the whole period of measurement. Also, the emitted NOx concentration measured immediately before a rich spike is executed reaches a level (denoted by A2 in FIG. 3C) that is higher than A1 reached by the normal catalyst.

Since the emitted NOx concentration immediately before a start of a rich-spike operation increases as the degradation of the catalyst progresses, the degree of degradation of the catalyst can be determined by detecting, by means of the NOx sensor 9, the emitted NOx concentration (A1, A2) immediately before the start of the rich-spike operation.

Where "A2" as mentioned above represents NOx evaluation value of the emitted NOx concentration at which it is determined that the catalyst has been degraded, the evaluation value A2 needs to be set to a considerably small value as compared with the permissible upper limit of the emitted NOx concentration so that the emitted NOx concentration does not exceed the permissible upper limit value under various conditions, as described above. Therefore, the evaluation value A2 may be set within a low concentration region in which the detection result of the NOx sensor 9 has a considerably reduced reliability (i.e., in which the NOx sensor 9 operates with considerably reduced reliability). In this case, the degree of degradation of the NOx storage/reduction catalyst cannot be accurately determined based on the output of the NOx sensor 9.

The exhaust emission control system of this embodiment overcomes the above-described problem by temporarily delaying a start of a rich-spike operation when the degradation of the NOx storage/reduction catalyst 9 is to be determined, so that the NOx storage amount of the NOx storage/reduction catalyst measured immediately before the start of the rich-spike operation becomes a sufficiently large value.

Specifically, when the degradation of the NOx storage/reduction catalyst is determined in the present embodiment, a rich-spike operation is not performed even if the NOx storage amount (represented by the value of the NOx counter) of the catalyst reaches value R1 (FIG. 3B) that provides a normal rich-spike starting condition, but a rich-spike operation is performed when the NOx storage amount reaches value R2 (FIG. 3B) that is larger than R1. For example, R2 is about 1.5 times as large as R1. Thus, the timing of the rich spike is delayed to a position denoted by RS' in FIG. 3A, and the NOx storage amount of the catalyst 7 increases up to the value R2 in response to the delay in the rich-spike timing, as indicated by the one-dot chain line CNX' in FIG. 3B.

As a result, the emitted NOx concentration associated with the degraded catalyst (FIG. 3C, N2) exceeds A2 and keeps increasing (as indicated by N3 in FIG. 3C) until it reaches C1 immediately before the rich spike RS'.

As shown in FIG. 3C, the emitted NOx concentration varies along N2 and N3 that curve downwards, and the inclination of the curve becomes steeper as the elapsed time measured from completion of the last rich-spike operation becomes longer. If the NOx counter value R2 that triggers a rich-spike operation is set to be, for example, 1.5 times as large as the reference value R1 as the normal rich-spike starting condition, therefore, the emitted NOx concentration C1 becomes larger than a level that is 1.5 times as high as A2. Thus, even in the case where A2 must be set around 10 ppm, C1 becomes as large as about 20 ppm, thus permitting highly accurate detection of NOx by the NOx sensor 9 located downstream of the catalyst 7.

In the conventional emission control system, it is determined, for judgment on degradation of the NOx storage/reduction catalyst 7, whether the emitted NOx concentration is higher than the level A2 at a point of time when time L elapses from the last rich-spike operation. In the present embodiment, on the other hand, the rich-spike operation is delayed (as shown in FIG. 3A) until time T passes, and substantially the same judgment on degradation of the catalyst is made by determining whether the emitted NOx concentration is higher than the level C1 at time T, which value C1 is higher than the emitted NOx concentration R2 that would be reached by the NOx storage/reduction catalyst in the conventional system.

Figure 4:
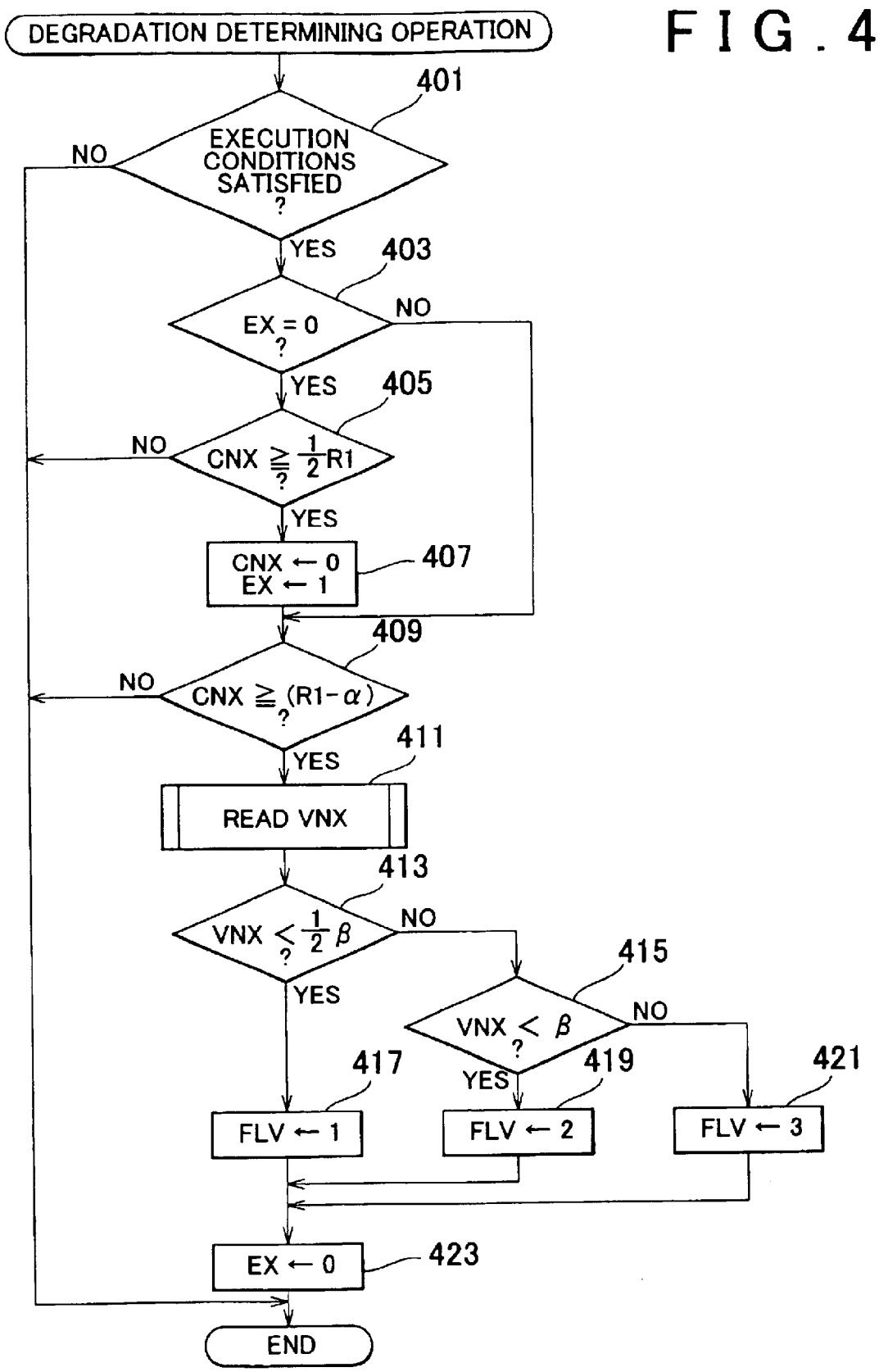
FIG. 4 is a flowchart showing one example of a degradation determining operation.

FIG. 4 is a flowchart useful for specifically explaining the above-described degradation determining operation according to the present embodiment. To perform this operation, the ECU 30 executes the routine of FIG. 4 at predetermined time intervals.

In the routine of FIG. 4, it is initially determined in step S401 whether conditions for execution of degradation determination are currently satisfied. The execution conditions used in step S401 may include, for example, a first condition that the engine 1 is operating at a lean air/fuel ratio, a second condition that a predetermined time has passed since the degradation determining operation was executed last time, and other conditions. The first condition is provided because the degradation determining operation cannot be carried out unless the engine 1 is operated at a lean air/fuel ratio. The second condition is provided because the amount of NOx emissions is temporarily increased during the degradation determining operation in which the interval of the rich-spike operations is temporarily prolonged (i.e., made longer than normal) and the NOx storage amount of the NOx storage/reduction catalyst is made larger than normal, and the total amount of NOx emissions may undesirably increase if the frequency of execution of the degradation determining operation is increased.

If all of the conditions of step S401 are satisfied, step S403 is then executed. If any one or more of the conditions of step S401 is/are not satisfied, step S403 and subsequent steps are not executed, and the current cycle of the routine of FIG. 4 is immediately finished.

It is determined in step S403 whether the value of flag EX is set to 0. The flag EX is provided for executing the next steps S405 and S407 only once after the execution conditions are determined to be satisfied in step S401. This flag EX is set to 1 in step S407, and is set to 0 in step S423 after the degradation determination is accomplished.

If the flag EX is equal to 0 in step S403, it is determined in step S405 whether the value of the NOx counter CNX is equal to or larger than one-half of the normal rich-spike execution reference value R1 (as shown in FIG. 3B). If $CNX \geq (\frac{1}{2}) \times R1$, the value of the NOx counter CNX is set to zero and the value of the flag EX is set to 1 in step S407. With the value of the flag EX thus set to 1, steps S405 and S407 are skipped in the next and subsequent cycles of the routine, and step S403 is followed by step S409.

With step S403 through step S407 thus executed, the operation to reset the value of the NOx counter CNX to zero after the CNX value increases up to one-half of the rich-spike execution reference value R1 is carried out only once after the conditions for execution of degradation determination are satisfied in step S401.

Figure 5:
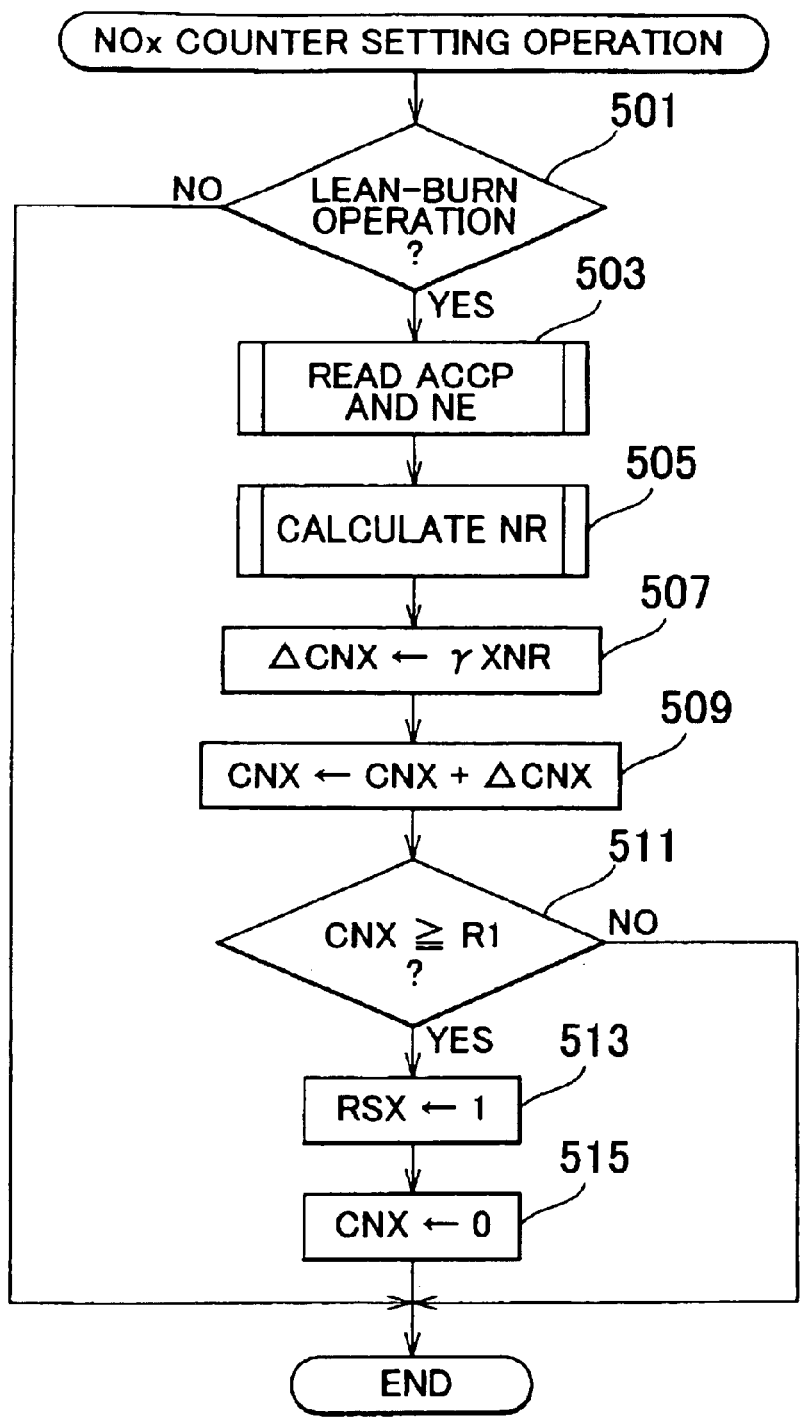
FIG. 5 is a flowchart showing an operation to set a NOx counter.

Here, the NOx counter CNX represents the amount of NOx stored in the NOx storage/reduction catalyst 7, as described above, and is set according to a routine as shown in FIG. 5.

FIG. 5 is a flowchart useful for explaining an operation to set the NOx counter CNX. To perform this operation, the ECU 30 executes the routine of FIG. 5 at predetermined time intervals.

In the routine of FIG. 5, when the engine 1 is operated at a lean air/fuel ratio (i.e., when an affirmative determination (YES) is made in step S501), the ECU 30 reads the accelerator pedal position or depression amount ACCP and the engine speed NE in step S503, and calculates in step S505 the amount NR of NOx generated by the engine 1 per unit time, from a numerical table prepared in advance, based on these values ACCP, NE.

The amount of NOx generated by the engine 1 per unit time is determined depending upon the engine operating conditions (such as the fuel amount and the air amount. In the present embodiment, the amounts of NOx generated by the engine per unit time are measured in advance while the engine is actually operated under varying operating conditions, and the measurement results are stored in the ROM of the ECU 30 in the form of a numerical table using ACCP and NE as engine operating parameters indicative of the fuel amount and the air amount. The amount NR of NOx generated by the engine per unit time during a lean-burn operation is calculated by using the numerical table, based on the accelerator pedal position ACCP and the engine speed NE.

Since the NOx storage/reduction catalyst 7 is supposed to store NOx which is a certain proportion (storage factor $\gamma$) of the amount NR of NOx generated by the engine 1, the amount of an increase $\Delta CNX$ in the NOx amount stored by the NOx storage/reduction catalyst per unit time (e.g., the interval of execution of the routine of FIG. 5) is calculated as $\Delta CNX = \gamma \times NR$ in step S507.

The NOx storage factor $\gamma$ of the NOx storage/reduction catalyst varies with catalyst conditions (such as the space velocity of the exhaust gas, temperature and the NOx storage amount), and so forth. While a predetermined value is used as the NOx storage factor $\gamma$ in the present embodiment, the storage factor $\gamma$ may be set depending upon the engine operating conditions (such as the exhaust flow rate and the temperature) and the NOx storage amount (the value of the NOx counter CNX). In this case, the NOx storage amount of the NOx storage/reduction catalyst can be further accurately calculated.

In step S509, the value of the NOx counter CNX is increased by the value $\Delta CNX$ equivalent to the calculated amount of NOx stored by the NOx storage/reduction catalyst 7 per unit time, each time the routine of FIG. 5 is executed. With this step, the value of the NOx counter CNX becomes equivalent to the amount of NOx currently stored in the NOx storage/reduction catalyst 7.

In the present embodiment, each time the value of the NOx counter CNX reaches the rich-spike reference value R1 (i.e., an affirmative determination (YES) is made in step S511), the value of rich-spike flag RSX is set to 1 in step S513, and the value of the NOx counter CNX is reset to 0 in step S515.

If the rich-spike flag RSX is set to 1, the ECU 30 performs an operation (not shown) that is separately executed, so that the engine 1 is operated at a rich air/fuel ratio for a certain short period of time, and the NOx stored in the NOx storage/reduction catalyst is reduced and removed, whereby the NOx storage amount is made approximately equal to zero. After the rich-spike operation is finished, the RSX value is reset to zero through an operation (not shown) that is separately executed.

In the above-described operation of step S403 through step S407, the value of CNX set in the manner as described above is reset to zero after it is increased up to $(\frac{1}{2}) \times R1$ when the degradation determining operation is performed. As a result, the value of CNX starts increasing from zero again in the routine of FIG. 5. When the rich-spike operation is executed (CNX$\geq$R1) in step S511 of FIG. 5, therefore, the actual CNX value should become equal to $1.5 \times R1$. Namely, through the operation of steps S403–S407, the rich-spike operation is not executed during the degradation determining operation until the value of the NOx counter becomes 1.5 times (R2 in FIG. 3B) as large as the normal rich-spike reference value R1.

Referring again to FIG. 4, after the reference value of the NOx storage amount at which the rich-spike operation is executed is set to be 1.5 times as large as the normal reference value R1, as described above, it is determined in step S409 whether the current value of the NOx counter CNX becomes equal to (R1−$\alpha$) ($\alpha$ is a sufficiently small value) to be established immediately before the rich-spike operation is executed. If the CNX value is equal to (R1−$\alpha$), the output VNX of the NOx sensor 9 is read in step S411. The VNX thus obtained represents the emitted NOx concentration achieved when the NOx storage amount of the NOx storage/reduction catalyst 7 is increased to be 1.5 times as large as the normal maximum storage amount. Thus, the NOx sensor 9 is able to detect the NOx emission amount in a region in which the exhaust NOx concentration is at a relatively high level, and an otherwise possible reduction in the detection accuracy can be avoided or suppressed.

Subsequently, in step S413 through step S421, the degree of degradation of the NOx storage/reduction catalyst 7 is determined based on the read value of the output VNX of the NOx sensor 9.

In the present embodiment, the degree of degradation of the NOx storage/reduction catalyst 7 is classified into three levels, depending upon the VNX value, namely, the amount of NOx emitted when the NOx storage amount is equal to R2 (=1.5×R1 in FIG. 3), which is 1.5 times as large as the reference NOx storage amount used during a normal lean-burn operation of the engine 1.

$VNX < (\frac{1}{2}) \times \beta \rightarrow $ NORMAL (1)

$(\frac{1}{2}) \times \beta \leq VNX < \beta \rightarrow $ LOW-LEVEL DEGRADATION (2)

$VNX \geq \beta \rightarrow $ HIGH-LEVEL DEGRADATION (3)

Here, "$\beta$" is the permissible upper limit value of the amount of NOx emitted during normal engine operations, and may be set to, for example, about 40 ppm.

More specifically, if the emitted NOx concentration does not reach one-half (e.g., 20 ppm) of the permissible upper limit value even when the amount of NOx stored in the catalyst is 1.5 times as large as the normal reference amount, it is determined that the NOx storage/reduction catalyst is in a normal condition (as noted above at (1)).

In this case, the value of parameter FLV that represents the degradation level of the catalyst 7 is set to 1 in the routine of FIG. 4 (steps S413 and S417), and the engine 1 performs a normal lean-burn operation (i.e., an operation at a lean air/fuel ratio).

If the emitted NOx concentration becomes equal to or higher than one-half of the permissible upper limit value but does not reach the permissible upper limit value (e.g., 40 ppm) in the condition where the amount of NOx stored in the catalyst is 1.5 times as large as the normal reference amount, it is determined that the NOx storage/reduction catalyst undergoes a low level of degradation (as noted above at (2)).

In this case, the emitted NOx amount is kept lower than the upper limit value in an engine operating condition in which the engine 1 emits a relatively small amount of NOx, but the emitted NOx amount may become equal to or larger than the permissible upper limit value under a condition where the amount of NOx emitted by the engine increases, for example, when the vehicle is accelerated or when the engine load is increased. In this case, the lean-burn operation is stopped and the engine is operated at the stoichiometric air/fuel ratio when the NOx emission amount of the engine is increased, such as when the engine load is increased, for example, during an acceleration of the vehicle, so that the amount of NOx generated by the engine is reduced, and an otherwise possible increase in the NOx emission amount is avoided or suppressed. If the low level of degradation is determined in the routine of FIG. 4, the value of the parameter FLV is set to 2 in steps S415 and S419 of FIG. 4.

If the emitted NOx concentration exceeds the permissible upper limit value (e.g., 40 ppm) in the condition where the amount of NOx stored in the catalyst is 1.5 times as large as the normal reference amount, it is determined that the NOx storage/reduction catalyst undergoes a high level of degradation (as noted above at (3)). In this case, the value of the parameter FLV is set to 3 in steps S415 and S421 of FIG. 4.

In this case, the possibility of degradation of a NOx absorbent due to, for example, progression of S poisoning is considered, and an operation to eliminate S poisoning is separately performed in which the engine exhaust temperature is immediately elevated and the engine is operated at a rich air/fuel ratio (or the stoichiometric air/fuel ratio) for a given period of time.

In the present embodiment, the ECU 30 causes the NOx sensor 9 to detect the exhaust NOx concentration in conditions in which the NOx storage/reduction catalyst 7 stores NOx in the amount 1.5 times as large as the normal reference amount and the amount of NOx discharged to the downstream side of the catalyst 7 is increased, as described above. Supposing that the degradation of the NOx storage/reduction catalyst is determined based on the emitted NOx amount in a condition where the normal reference amount of NOx is stored in the catalyst, for example, it would be necessary to accurately determine the NOx concentration of, for example, about 10 ppm so as to determine the low level of degradation (as in the case (1) above). In this case, the degradation determination is made in a region in which the NOx sensor operates with low detection accuracy, and the accuracy of the degradation determination is considerably reduced.

In the present embodiment, on the other hand, the NOx storage amount achieved immediately before execution of the rich-spike operation is increased to be, for example, 1.5 times as large as the normal reference amount, thereby permitting determination of low-level degradation in the NOx concentration region (around 20 ppm) that is twice as high as that of the above-described case. In this case, the detection accuracy of the NOx sensor can be significantly improved, and the reliability of the result of the determination can be improved.

While the NOx storage amount of the NOx storage/reduction catalyst is increased to be 1.5 times as large as the normal reference amount at the time of degradation determination in the present embodiment, the degree of the increase of the NOx storage amount depends upon or varies with the type of the catalyst. Also, since the emitted NOx concentration is actually increased during the degradation determination, it is preferable to determine the degree by which the NOx storage amount is increased at the time of degradation determination, through experiments using the actual catalyst.

In the present embodiment, the degree of degradation of the NOx storage/reduction catalyst is determined directly from the output value VNX of the NOx sensor. However, the degradation determination may be made by using the average value or integrated value of VNX obtained up to a point immediately before a start of a rich spike, instead of directly using the VNX value for determination. In this case, too, the reliability of the degradation determination can be improved by increasing the NOx storage amount at the time of the degradation determination.

Figure 6:
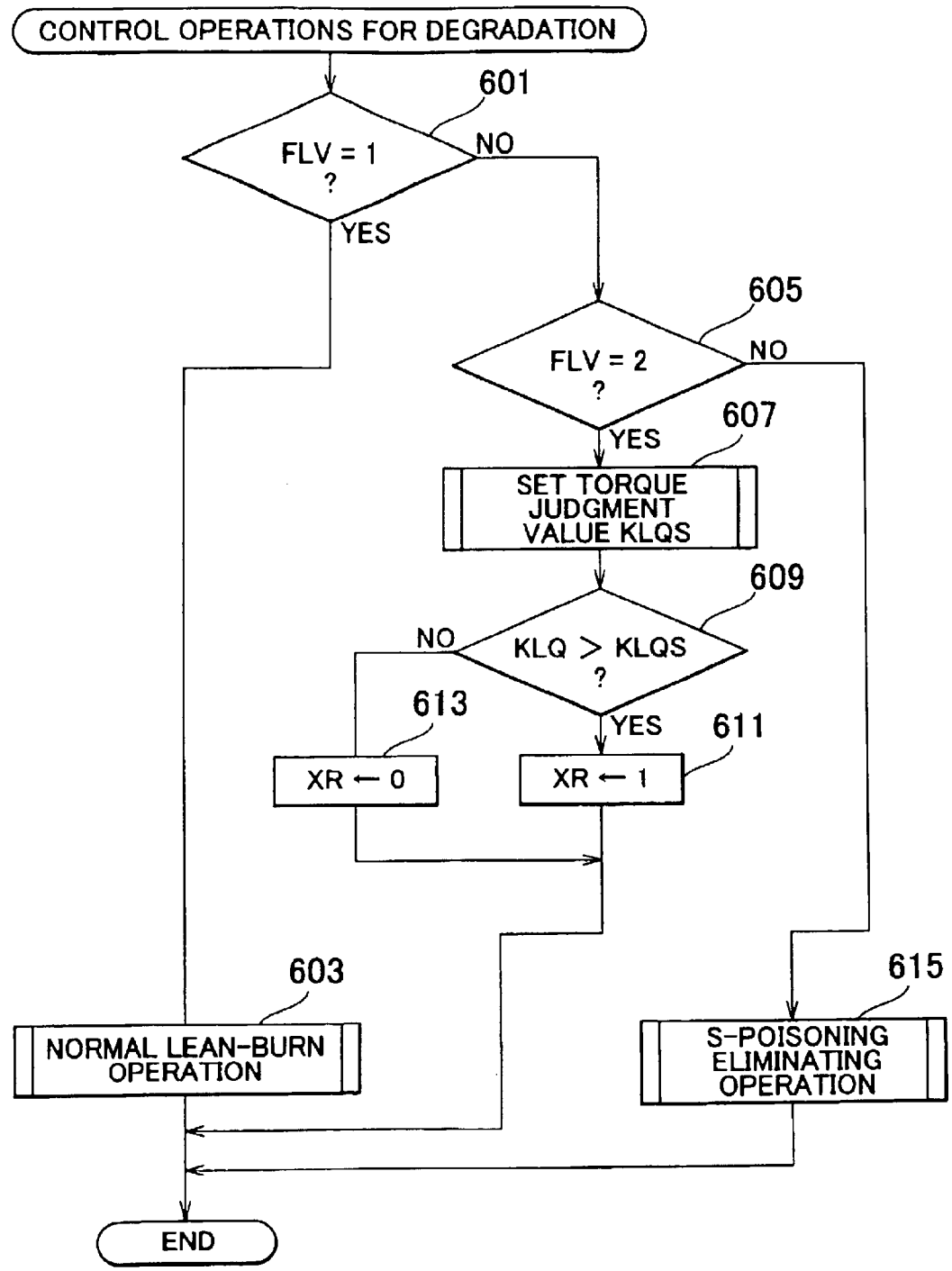
FIG. 6 is a flowchart showing engine control operations performed based on the result of the degradation determination.

FIG. 6 is a flowchart useful for explaining control operations performed on the engine based on the result of determination on the degradation of the catalyst as described above. To perform the control operations, the ECU 30 executes the routine of FIG. 6 at predetermined time intervals.

In the routine of FIG. 6, operations that depend upon the degradation levels as explained above at (1)–(3) are performed. In steps S601 and S605, the current degradation level of the NOx storage/reduction catalyst 7 is determined based on the value of the degradation parameter FLV set in the routine of FIG. 4. If the catalyst 7 is in a normal condition (i.e., if FLV=1), a general lean-burn operation in which the engine is operated at a lean air/fuel ratio is performed in step S603.

If the catalyst 7 undergoes a low level of degradation (i.e., if FLV=2), step S605 is followed by step S607, in which a judgment value KLQS of the engine torque (e.g., the accelerator depression amount or the fuel injection amount) at which the engine 1 is switched to operation at a rich air/fuel ratio is set based on the current engine speed. The judgment value KLQS is the output torque at which the amount of NOx generated by the engine increases to an extent or point where the NOx concentration measured downstream of the catalyst 7 exceeds a permissible level, at the current engine speed. Specifically, the KLQS is set through experiments using the actual engine.

If it is determined in step S609 that the current engine output torque (e.g., the accelerator depression amount or the fuel injection amount) KLQ is greater than the judgment value KLQS calculated in step S607, the control process proceeds to step S611 to set the value of rich flag XR to 1.

If the rich flag XR is set to 1, the air/fuel ratio at which the engine 1 is operated is switched to the stoichiometric air/fuel ratio in an operation separately executed by the ECU 30. In this manner, the engine 1 is operated at the stoichiometric air/fuel ratio in an operating condition in which the amount of NOx generated by the engine is increased, for example, when the vehicle is accelerated or the engine load is increased, so that the amount of NOx generated by the engine is reduced. With the reduction in the amount of NOx generated by the engine, the amount of NOx emitted from the NOx storage/reduction catalyst is prevented from exceeding the permissible value even if the catalyst suffers the low level of degradation.

If it is determined in step S609 that the current output torque is smaller than the judgment value KLQS, the value of the rich flag XR is set to 0, and the engine is kept operating at a lean air/fuel ratio.

If it is determined in step S605 that FLV is not equal to 2, FLV is equal to 3, namely, the current degradation state of the catalyst 7 is equivalent to a high level of degradation, in other words, the catalyst 7 currently undergoes a high level of degradation. In this case, the lean-burn operation is immediately stopped, and an operation to eliminate S poisoning is performed in step S615 so as to restore the NOx storage capacity of the NOx storage/reduction catalyst.

In the operation to eliminate S poisoning, the engine is operated at a rich air/fuel ratio or at the stoichiometric air/fuel ratio so that the exhaust temperature is increased. With this operation, a high-temperature exhaust gas having a rich or stoichiometric air/fuel ratio is supplied to the NOx storage/reduction catalyst, and SOx stored in the NOx storage/reduction catalyst is discharged from the catalyst, so that the NOx storage capacity of the catalyst is restored.

If it is determined that the catalyst undergoes a high level of degradation, an alarm lamp positioned at the driver's seat may be turned on so as to inform the driver of the degradation of the catalyst at the same time that the S-poisoning eliminating operation is executed.

As described above, in the present embodiment, the reference NOx storage amount (NOx counter value) based on which a rich spike is executed is set to be larger during degradation determination, than that used in normal engine operations, so as to permit highly accurate degradation determination using the NOx sensor. If rich spikes are executed, for example, at predetermined time intervals, or at intervals of a predetermined running distance, or for each integrated value of the engine speed, without using the NOx counter, the interval of the rich spikes (or the running distance or the integrated value of the engine speed based on which each rich spike is executed) is increased, so as to permit highly accurate degradation determination using the NOx sensor, in a similar manner to that of the illustrated embodiment.

What is claimed is:

1. An exhaust emission control system for an internal combustion engine, comprising:

a NOx storage/reduction catalyst disposed in an exhaust passage of the internal combustion engine, the NOx storage/reduction catalyst selectively storing NOx contained in exhaust gas flowing into the catalyst, through adsorption, absorption, or both of adsorption and absorption, when an air/fuel ratio of the exhaust gas is lean, and reducing and removing the stored NOx by using reducing components in the exhaust gas when the air/fuel ratio of the exhaust gas becomes equal to a stoichiometric air/fuel ratio or a rich air/fuel ratio;

a NOx sensor positioned in the exhaust passage downstream of the NOx storage/reduction catalyst, the NOx sensor being operable to detect a NOx concentration in the exhaust gas; and a controller that:

performs a rich-spike operation to temporarily operate the engine at a rich air/fuel ratio each time a NOx storage state of the NOx storage/reduction catalyst satisfies a predetermined rich-spike condition during an operation of the engine at a lean air/fuel ratio, so as to supply exhaust gas having a rich air/fuel ratio to the NOx storage/reduction catalyst for reduction and removal of the NOx stored in the NOx storage/reduction catalyst;

determines a degree of degradation of the NOx storage/reduction catalyst by comparing an output value of the NOx sensor obtained in a predetermined determination period during the operation of the engine at a lean air/fuel ratio, with a predetermined evaluation value; and changes the rich-spike condition so that an amount of NOx stored in the NOx storage/reduction catalyst at the time of a start of the rich-spike operation during the determination period is made larger than the amount of NOx stored in the catalyst at the time of the start of the rich-spike operation during a period other than the determination period.

2. The exhaust emission control system according to claim 1, wherein the controller delays the start of the rich-spike operation during the determination period so as to increase the amount of NOx stored in the NOx storage/reduction catalyst at the time of the start of the rich-spike operation during the determination period, to be larger than the amount of NOx stored in the NOx storage/reduction catalyst at the time of the start of the rich-spike operation during the period other than the determination period.

3. The exhaust emission control system according to claim 1, wherein:

the controller uses the amount of NOx stored in the NOx storage/reduction catalyst as the NOx storage state of the NOx storage/reduction catalyst, and uses a condition that the amount of NOx stored in the catalyst reaches a predetermined reference storage amount as the predetermined rich-spike operation; and the controller sets the reference storage amount during the determination period to a larger value than the reference storage amount set during the period other than the determination period, so as to increase the amount of NOx stored in the NOx storage/reduction catalyst at the time of the start of the rich-spike operation during the determination period, to be larger than the amount of NOx stored in the NOx storage/reduction catalyst at the time of the start of the rich-spike operation during the period other than the determination period.

4. The exhaust emission control system according to claim 1, wherein:

the controller uses an elapsed time measured from the time of completion of the last rich-spike operation as the NOx storage state of the NOx storage/reduction catalyst, and uses a condition that the elapsed time reaches a predetermined reference time as the predetermined rich-spike condition; and the controller sets the reference time during the determination period to be longer than the reference time set during the period other than the determination period, so as to increase the amount of NOx stored in the NOx storage/reduction catalyst at the time of the start of the rich-spike operation during the determination period, to be larger than the amount of NOx stored in the NOx storage/reduction catalyst at the time of the start of the rich-spike operation during the period other than the determination period.

5. An exhaust emission control method for an internal combustion engine, comprising the steps of:

providing a NOx storage/reduction catalyst in an exhaust passage of the internal combustion engine, the NOx storage/reduction catalyst selectively storing NOx contained in exhaust gas flowing into the catalyst, through adsorption, absorption, or both of adsorption and absorption, when an air/fuel ratio of the exhaust gas is lean, and reduces and removes the stored NOx by using reducing components in the exhaust gas when the air/fuel ratio of the exhaust gas becomes equal to a stoichiometric air/fuel ratio or a rich air/fuel ratio;

positioning a NOx sensor in the exhaust passage downstream of the NOx storage/reduction catalyst, the NOx sensor being operable to detect a NOx concentration in the exhaust gas;

performing a rich-spike operation to temporarily operate the engine at a rich air/fuel ratio each time a NOx storage state of the NOx storage/reduction catalyst satisfies a predetermined rich-spike condition during an operation of the engine at a lean air/fuel ratio, so as to supply exhaust gas having a rich air/fuel ratio to the NOx storage/reduction catalyst for reduction and removal of the NOx stored in the NOx storage/reduction catalyst;

determining a degree of degradation of the NOx storage/reduction catalyst by comparing an output value of the NOx sensor obtained in a predetermined determination period during the operation of the engine at a lean air/fuel ratio, with a predetermined evaluation value; and changing the rich-spike condition so that an amount of NOx stored in the NOx storage/reduction catalyst at the time of a start of the rich-spike operation during the determination period is made larger than the amount of NOx stored in the catalyst at the time of the start of the rich-spike operation during a period other than the determination period.

6. The exhaust emission control method according to claim 5, wherein the start of the rich-spike operation is delayed during the determination period so that the amount of NOx stored in the NOx storage/reduction catalyst at the time of the start of the rich-spike operation during the determination period is increased to be larger than the amount of NOx stored in the NOx storage/reduction catalyst at the time of the start of the rich-spike operation during the period other than the determination period.

7. The exhaust emission control method according to claim 5, wherein:

the amount of NOx stored in the NOx storage/reduction catalyst is used as the NOx storage state of the NOx storage/reduction catalyst, and a condition that the amount of NOx stored in the catalyst reaches a predetermined reference storage amount is used as the predetermined rich-spike operation; and the reference storage amount is set during the determination period to a larger value than the reference storage amount set during the period other than the determination period, so that the amount of NOx stored in the NOx storage/reduction catalyst at the time of the start of the rich-spike operation during the determination period is increased to be larger than the amount of NOx stored in the NOx storage/reduction catalyst at the time of the start of the rich-spike operation during the period other than the determination period.

8. The exhaust emission control method according to claim 5, wherein:

an elapsed time measured from the time of completion of the last rich-spike operation is used as the NOx storage state of the NOx storage/reduction catalyst, and a condition that the elapsed time reaches a predetermined reference time is used as the predetermined rich-spike condition; and the reference time is set during the determination period to be longer than the reference time set during the period other than the determination period, so that the amount of NOx stored in the NOx storage/reduction catalyst at the time of the start of the rich-spike operation during the determination period is increased to be larger than the amount of NOx stored in the NOx storage/reduction catalyst at the time of the start of the rich-spike operation during the period other than the determination period.

* * * * *